United States Patent
Albuquerque et al.

(10) Patent No.: US 11,782,142 B2
(45) Date of Patent: Oct. 10, 2023

(54) DEVICE DESIGNED TO DETECT SURROUNDINGS AND METHOD FOR CLEANING A COVER OF A DEVICE OF THIS TYPE

(71) Applicant: Robert Bosch GmbH, Stuttgart (DE)

(72) Inventors: Andre Albuquerque, Penalva do Castelo (PT); Annemarie Holleczek, Stuttgart (DE); Joao Oliveira, Fao (PT); Pedro Caldelas, Braga (PT); Maria Vorontsova, Braga (PT); Ricardo Andre, Braga (PT)

(73) Assignee: ROBERT BOSCH GMBH, Stuttgart (DE)

( * ) Notice: Subject to any disclaimer, the term of this patent is extended or adjusted under 35 U.S.C. 154(b) by 318 days.

(21) Appl. No.: 16/760,247

(22) PCT Filed: Nov. 12, 2018

(86) PCT No.: PCT/EP2018/080873
§ 371 (c)(1),
(2) Date: Apr. 29, 2020

(87) PCT Pub. No.: WO2019/105723
PCT Pub. Date: Jun. 6, 2019

(65) Prior Publication Data
US 2020/0355808 A1    Nov. 12, 2020

(30) Foreign Application Priority Data
Nov. 30, 2017 (DE) .......................... 102017221530.5

(51) Int. Cl.
*B60S 1/48* (2006.01)
*B60S 1/52* (2006.01)
(Continued)

(52) U.S. Cl.
CPC ............... *G01S 7/497* (2013.01); *B60S 1/485* (2013.01); *B60S 1/487* (2013.01); *B60S 1/522* (2013.01);
(Continued)

(58) Field of Classification Search
CPC .......... B60S 1/485; B60S 1/487; B60S 1/522; B60S 1/542; B60S 1/544; G01S 7/497;
(Continued)

(56) References Cited

U.S. PATENT DOCUMENTS

| 4,809,384 A | 3/1989 | Yokota et al. |
| 2012/0117745 A1 | 5/2012 | Hattori et al. |

(Continued)

FOREIGN PATENT DOCUMENTS

| CN | 1539161 A | 10/2004 |
| CN | 106536296 A | 3/2017 |

(Continued)

OTHER PUBLICATIONS

International Search Report for PCT/EP2018/080873, dated Feb. 4, 2019.

*Primary Examiner* — Thomas Raymond Rodgers
(74) *Attorney, Agent, or Firm* — NORTON ROSE FULBRIGHT US LLP; Gerard Messina

(57) ABSTRACT

A device which is designed to detect surroundings and which includes a housing and a sensor situated within the housing. The housing includes a transmitter/receiver window, through which the corresponding sensor signals may be emitted into the surroundings by the sensor, and/or sensor signals from the surroundings may be received. The device includes a cover, the cover being designed to be transparent to the sensor signals, and the cover being designed to cover the transmitter/receiver window against exterior surroundings of the device. The device includes a cleaning unit, which is situated at an outside of the housing and is movable relative to the housing using a drive unit. The cleaning unit is designed to remove contaminants from the cover. The cleaning unit includes at least one first nozzle to spray a cleaning liquid onto the cover, and at least one second nozzle to blow a gas onto the cover.

12 Claims, 3 Drawing Sheets

(51) Int. Cl.
*B60S 1/54* (2006.01)
*B60S 1/56* (2006.01)
*G01S 7/497* (2006.01)
*G01S 7/481* (2006.01)

(52) U.S. Cl.
CPC .............. *B60S 1/542* (2013.01); *B60S 1/544* (2013.01); *B60S 1/566* (2013.01); *G01S 7/4813* (2013.01); *G01S 2007/4977* (2013.01)

(58) Field of Classification Search
CPC ........... G01S 7/4813; G01S 2007/4977; B02B 27/0006
USPC .......................................................... 134/18
See application file for complete search history.

(56) References Cited

U.S. PATENT DOCUMENTS

| | | | |
|---|---|---|---|
| 2016/0315564 A1 | 10/2016 | Kotani | |
| 2017/0369039 A1 | 12/2017 | Rousseau | |
| 2018/0086316 A1* | 3/2018 | Trebouet | B08B 3/08 |
| 2018/0134259 A1* | 5/2018 | Wachter | G01S 17/931 |
| 2018/0215350 A1* | 8/2018 | Herrmann | B60S 1/524 |
| 2018/0265048 A1* | 9/2018 | Schmidt | B08B 5/02 |
| 2018/0361997 A1* | 12/2018 | Schmidt | G02B 27/00 |
| 2019/0299938 A1* | 10/2019 | Deegan | B60S 1/56 |
| 2020/0238305 A1* | 7/2020 | Saito | B60S 1/56 |

FOREIGN PATENT DOCUMENTS

| | | |
|---|---|---|
| DE | 3839484 A1 | 5/1990 |
| DE | 29514364 U1 | 1/1996 |
| DE | 102011017684 A1 | 11/2011 |
| DE | 102011004442 A1 | 8/2012 |
| DE | 102012222126 A1 | 6/2014 |
| DE | 102014004172 A1 | 9/2014 |
| DE | 102015013203 A1 | 3/2016 |
| FR | 2690635 A1 | 11/1993 |
| JP | S4839784 U | 5/1973 |
| JP | 2011240916 A | 12/2011 |
| JP | 2011240920 A | 12/2011 |
| WO | 2007006890 A1 | 1/2007 |
| WO | 2014007294 A1 | 1/2014 |
| WO | 2015003705 A1 | 1/2015 |
| WO | 2016004936 A1 | 1/2016 |
| WO | 2016074933 A1 | 5/2016 |
| WO | 2016116568 A1 | 7/2016 |
| WO | 2017167577 A1 | 10/2017 |

* cited by examiner

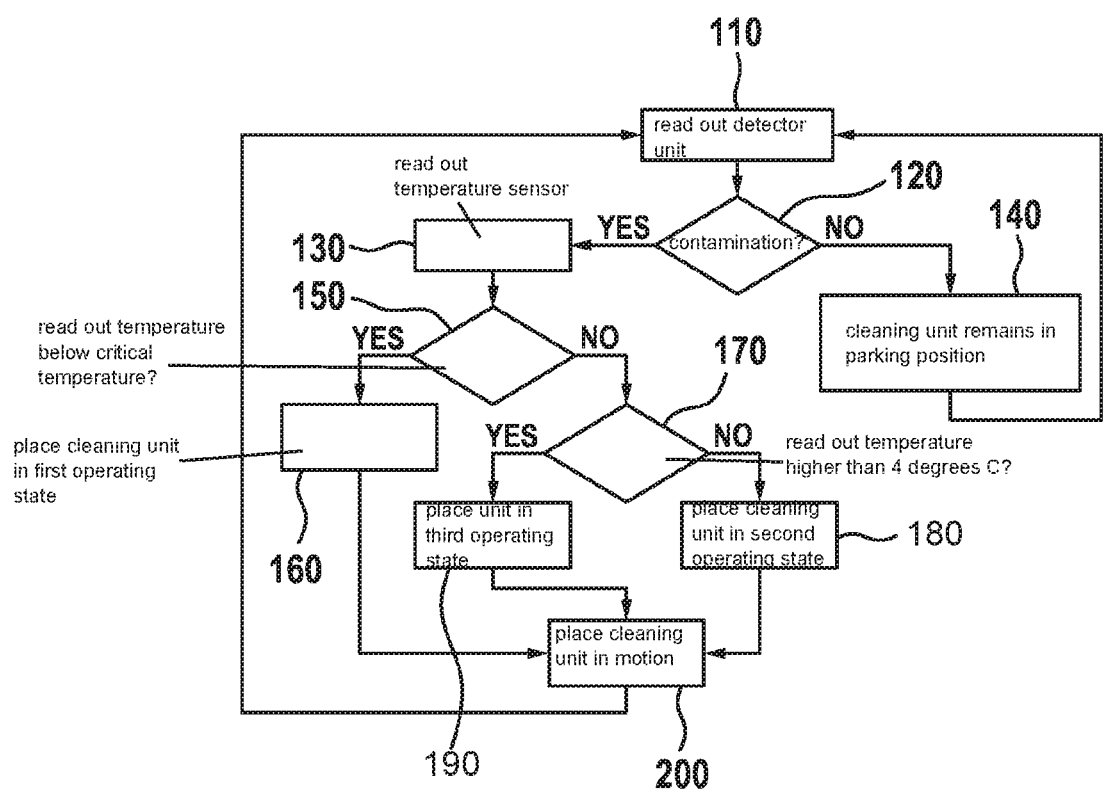

DEVICE DESIGNED TO DETECT SURROUNDINGS AND METHOD FOR CLEANING A COVER OF A DEVICE OF THIS TYPE

FIELD

The present invention relates to a device designed to detect surroundings, in particular the surroundings of a vehicle, as well as a method for cleaning a cover of a device of this type.

BACKGROUND INFORMATION

The ability to detect vehicle surroundings preferably completely with the aid of sensors is a fundamental requirement for automated driving. Different surroundings sensors are used for this purpose, for example radar sensors, ultrasonic sensors, cameras and LIDAR systems, which each must be integrated into a vehicle. Surroundings sensors of a vehicle may typically be subjected to harsh ambient conditions. Contaminants of many different types may occur. In a camera or a LIDAR sensor, for example, contaminants may significantly influence the signal quality, for example if the cover of a transmitter/receiver window is blocked to light to be emitted or received, due to a contaminant. In the worst case, the relevant sensor may supply no or only incomplete or erroneous information about the vehicle surroundings. This is unacceptable, in particular for autonomous driving, and a mechanism for removing a contamination of the sensor must be provided.

Conventional wiper systems are described in United States Pat. Appl. Pub. No. US 2016/0315564 A1 and PCT Application No. WO 2015/003705 A1, which remove contaminants from the cover of a transmitter/receiver window of a sensor with the aid of a wiper blade in the manner of a windshield wiper.

PCT Application No. WO 2016/004936 A1 describes blowing off dirt with the aid of air nozzles.

German Patent Application No. DE 102011017684 A1 describes rinsing off dirt with the aid of water nozzles.

In using wiper systems, the problem arises that, although contaminants such as water drops, mud splashes or insects, which may collect over a wide area on the cover of a transmitter/receiver window of a sensor, may be very effectively removed, these contaminants may collect on the sides of the wiper blade, which may lead to undesirable smearing effects over some time.

Air nozzles are suitable for removing contaminants which do not adhere very strongly to the surface of the cover, such as water drops. Once the contaminant adheres strongly, however, for example in the case of dried mud, tree resin or insects, air nozzles are no longer efficient in cleaning the cover. Water nozzles may detach such strongly adhering contaminants, but problems may arise at low temperatures (e.g., $T \leq 4°$ C.), due to the freezing of the washing liquid and a resulting clogging of the nozzle. Although the use of antifreeze agents may shift the limiting temperature at which a use of the water nozzle is possible to lower temperatures, a reliable usability may nevertheless not be ensured under all possible conditions.

It is therefore clear that each of the conventional systems may deploy its ideal cleaning efficiency only under certain conditions.

An object of the present invention may thus be seen as combining the conventional principles of cleaning surroundings sensors in such a way that an optimal cleaning result may always be achieved independently of the ambient conditions (for example, temperature T) and the type of contaminant on the cover of a transmitter/receiver window of a relevant sensor.

SUMMARY

According to the present invention, an example device is provided, which is designed to detect surroundings and includes a cleaning unit, the cleaning unit implementing various cleaning principles. This ensures that an optimal cleaning result is achievable under different ambient conditions and with different types of contamination, and it is thus ensured that the surroundings sensor of the device may always carry out a surroundings detection without signals being blocked by contaminants.

In accordance with an example embodiment of the present invention, a device is provided, which is designed to detect surroundings, in particular to detect the surroundings of a vehicle, which includes a housing and at least one sensor situated within the housing. The housing includes a transmitter/receiver window, through which the corresponding sensor signals may be emitted into the surroundings by the sensor, and/or sensor signals from the surroundings may be received. The device includes a cover, the cover being designed to be transparent to the sensor signals, and the cover being designed to cover the transmitter/receiver window and thus the at least one sensor against exterior surroundings of the device. The sensor may be, for example, a camera and/or a LIDAR sensor. A camera receives light, for example visible light, as sensor signals, and the cover is therefore designed in this case, for example as a window pane transparent to light, for example made from glass. A LIDAR sensor emits laser beams having a wavelength, for example in the visible or in the IR range, as sensor signals and receives the laser beams reflected on objects in the surroundings with the aid of one or multiple light detectors. In this case as well, the cover may be designed, for example as a transparent window pane, e.g., made from glass, polycarbonate (PC) or polymethyl methacrylate (PMMA), which is transparent to light of the laser wavelength.

According to the present invention, the example device includes a cleaning unit, which is situated at an outside of the housing and is movable relative to the housing with the aid of a drive unit. The cleaning unit is designed to remove contaminants from the cover. For this purpose, the cleaning unit includes at least one first nozzle, which is designed to spray a cleaning liquid, in particular water, onto the cover. The cleaning unit furthermore includes at least one second nozzle, which is designed to blow a gas, in particular compressed air, onto the cover.

The cleaning unit also preferably includes at least one wiper blade, which is in friction contact with the cover. The cleaning unit particularly preferably includes at least two wiper blades of this type. The wiper blades are designed to remove a contaminant by the relative movement of the cover and cleaning unit and may include, for example, one or multiple rubber lips for this purpose.

In one preferred embodiment, the housing includes at least one guide rail. The cleaning unit is situated at the outside of the housing with the aid of the guide rail and may be moved along the guide rail with the aid of the drive unit, in particular back and forth in front of the cover.

Alternatively, the cleaning unit may also be controlled via a centrally supported, pivotable arm or via a centrally supported motor. Alternatively, any other mechanical drive unit is also possible, for example via gear wheels. Alternatively, the guide rails may be movably situated, the cleaning unit being fixedly installed.

The first and second nozzles are connected to reservoirs containing cleaning liquid or cleaning gas, for example via hoses. The cleaning liquid and/or the gas may preferably be heated as needed, for example by heating the particular reservoir and/or by heating the particular nozzle.

The cleaning unit may further include at least one heating element, which is designed to heat the cover.

A contamination by ice on the cover may be directly removed by heating the cleaning liquid and/or the gas or by heating the cover. It may also be avoided that the cleaning liquid freezes, and the first nozzles become clogged thereby, at low outdoor temperatures.

The drive unit may include, for example, a step motor.

In one preferred embodiment of the present invention, the device designed to detect surroundings also includes a detector unit, which is designed to detect a contamination of the cover. For this purpose, the detector unit may be designed, for example, as an optical sensor such as, for example, a camera. The detector unit may be designed, for example, to capture an image of the cover at regular time intervals. It may be determined from the captured image whether a contamination of the cover exists, using conventional digital image processing methods. If a contamination is detected, the cleaning unit may be activated.

The technical advantage is thus achieved that the cleaning unit is placed into operation and moved only as needed, i.e., only in the presence of an actual contamination. This permits a particularly efficient use of the device.

In another preferred embodiment of the present invention, the device designed to detect surroundings includes a temperature sensor, which is designed and situated to detect a temperature of the cover and/or the surroundings of the device.

In another preferred embodiment of the present invention, it is provided that the cleaning unit includes at least two second nozzles and at least one first nozzle, the first and second nozzles being situated in series with respect to a movement direction of the cleaning unit. The cleaning unit particularly preferably includes two second nozzles and at least three first nozzles, the three first nozzles being situated between the second nozzles. The first and second nozzles may be activated, depending on the instantaneous movement direction of the cleaning unit, in such a way that a synergy effect results between the cleaning with the aid of a cleaning liquid and the cleaning by a gas.

According to another aspect of the present invention, an example method is provided for cleaning a cover of a device for detecting surroundings, the device being designed as described above. The device includes a cleaning unit, which is moved relative to the housing with the aid of the drive unit, contaminants being removed from the cover with the aid of the cleaning unit.

The cleaning unit includes first and second nozzles, the first and second nozzles preferably being activated depending on the instantaneous movement direction of the cleaning unit.

In one preferred embodiment of the present invention, the example method also measures a temperature of the surroundings and/or the cover, and the first nozzles and/or the second nozzles are activated depending on the measured temperature. A heating of the nozzles and/or cleaning media (gas and/or cleaning liquid) dispensed by the nozzles may furthermore be controlled depending on the measured temperature.

The example device according to the present invention and the example method according to the present invention offer the advantages that a combination of various cleaning media or cleaning principles may take place in a single compact system. The cleaning of the cover of a transmitter/receiver window of a surroundings sensor may take place adaptively, depending on the instantaneous ambient conditions, for example the weather situation. Due to the possible combined use of nozzles and wiper blades, it is prevented that dirt accumulates on the sides of the wiper blades, since this dirt is removed from the nozzles with the aid of the gas and/or the cleaning liquid. A de-icing of the cover may also take place in combination with an ability to heat the cleaning media (gas and/or cleaning liquid).

BRIEF DESCRIPTION OF THE DRAWINGS

FIG. 3 shows a flowchart of one possible embodiment of a method according to the present invention.

DETAILED DESCRIPTION OF EXAMPLE EMBODIMENTS

Figure 1:
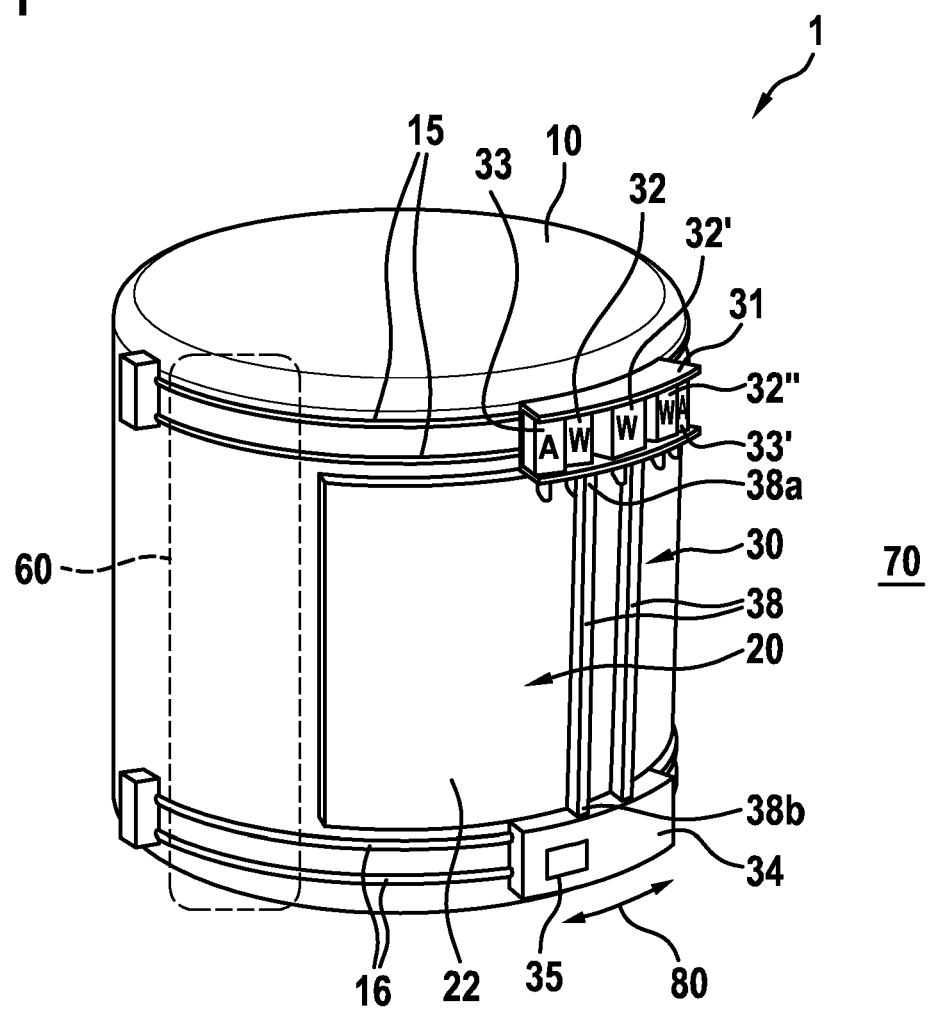
FIG. 1 shows a device according to one exemplary embodiment of the present invention.

In the description below of exemplary embodiments of the present invention, the same elements are designated by the same reference numerals, a repeated description of these elements is dispensed with, as the case may be. The figures illustrate the subject matter of the present invention only schematically.

FIG. 1 shows an example of a device 1 designed to detect surroundings, which is designed, for example, as a LIDAR sensor system. Device 1 includes a housing 10. A LIDAR sensor (not illustrated) is situated within the housing. The housing includes a transmitter/receiver window 20, through which laser beams are emitted into the surroundings in the conventional manner and reflected signals from the surroundings may be received. Transmitter/receiver window 20 includes a cover 22, the cover being designed to be transparent to sensor signals of the LIDAR sensor. The cover is designed to cover the LIDAR sensor against external surroundings 70 of the device. In this example, housing 10 is provided with an essentially cylindrical design, but may also be alternatively provided with a flat or planar design. Cover 22 is designed as a glass pane, which has a curvature corresponding to the curvature of the housing wall, so that housing 10 has an essentially smooth surface. Alternatively, cover 22 may also be formed from a plastic, in particular PC or PMMA.

Device 1 includes a cleaning unit 30, which is situated at an outside of the housing and is movable along housing 10 with the aid of a drive unit 35. For this purpose, housing 10 includes two guide rails 15 above the cover and two further guide rails 16 below the cover, cleaning unit 30 being situated at the outside of housing 10 with the aid of guide rails 15, 16. Guide rails 15, 16 follow the curvature of housing 10. Cleaning unit 30 includes three first nozzles 32, 32', 32" (water nozzles), which are each designed to spray water onto cover 22. For this purpose, nozzles 32, 32', 32" are connected to a water tank, which is not illustrated, e.g., via hoses. The cleaning unit also includes two second nozzles 33, 33', which are each designed to blow compressed air onto cover 22. Nozzles 32, 32', 32", 33 and 33' are situated in a first holding unit 31, holding unit 31 being supported at upper guide rails 15. The cleaning unit also includes two vertically oriented wiper blades 38, which are each in friction contact with cover 22. The wiper blades are each fastened by an upper end 38a to first holding unit 31. Nozzle 32' is situated between the wiper blades. Two further first nozzles 32 and 32" are situated at the other sides of wiper blades 38 in each case. A second nozzle 33, 33' is situated on the ends of holding unit 31. The first nozzles are thus situated between the second nozzles. Wiper blades 38 are each fastened by a lower end 38b to a second holding unit 34, second holding unit 34 being supported at lower guide rails 16. Second holding unit 34 includes a drive unit 35 which is designed, for example, as a step motor, entire cleaning unit 30 being movable back and forth along the housing with the aid of drive unit 35, as indicated by double arrow 80. First and second nozzles 32, 32', 32", 33 and 33' are thus situated in series with respect to a movement direction 80 of cleaning unit 30. If cleaning unit 30 is moved, wiper blades 38 may wipe contaminants from cover 22, which were previously loosened, for example with the aid of water from nozzles 32, 32', 32". The wiper blade situated at the front in the movement direction thus removes coarse contaminants, but may leave behind smaller particles or water trails. These residual contaminants may subsequently be removed by the following wiper blade in the movement direction. Nozzles 33, 33' designed as air nozzles may be optionally provided with a heatable design, so that the blown-out air has an elevated temperature and may thus remove, for example, ice on the cover. Alternatively or additionally, nozzles 32, 32' and 32" may also be provided with a heatable design.

A parking position 60 laterally adjacent to cover 22 is also provided, at which cleaning unit 30 remains when no cleaning of cover 22 is necessary. In the illustration selected in FIG. 1, a parking position 60 is shown or visible in a top view to the left adjacent to cover 22. However, it is preferred to provide a parking position 60 on each of the two sides of cover 22. After ending the cleaning operation, cleaning unit 30 remains in the particular parking position reached.

In addition, device 1 may include a detector unit (not illustrated), which is designed to detect a contamination of cover 22, for example optically. The drive unit may be set into operation as needed, and the cover may be cleaned by cleaning unit 30 only if contamination is actually present.

Device 1 may also include a temperature sensor (not illustrated), which is designed to detect an instantaneous temperature of cover 22 and/or of surroundings 70. If a very low temperature is detected, a use of water nozzles 32, 32' and 32", for example, may be dispensed with to avoid freezing.

Although the device illustrated in FIG. 1 has a curved surface of housing 10 as well as cover 22, the illustrated principle may also be used for other surfaces, e.g., planar surfaces, with slight adaptations. It is likewise possible to situate the guide rails at different locations, for example horizontally next to the cover.

Figure 2A:
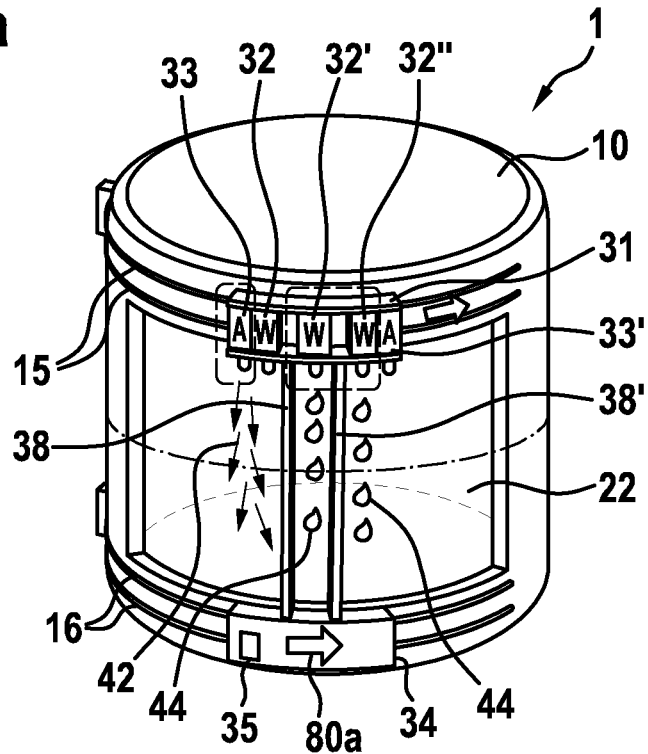
FIGS. 2a) and 2b) each show the device from FIG. 1 during the operation of the cleaning unit.
Figure 2B:
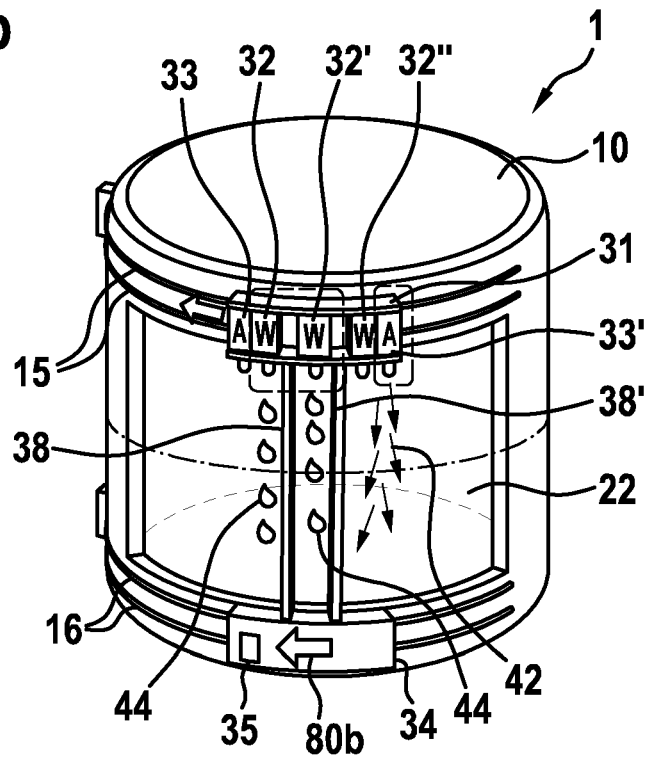

Two operating states of a device 1 according to the present invention during the cleaning of cover 22 are illustrated in FIGS. 2a) and 2b). The design of device 1 corresponds to device 1 shown in FIG. 1. In FIG. 2a), cleaning unit 30 moves to the right or counterclockwise, as indicated by arrow 80a. In FIG. 2b), cleaning unit 30 moves to the left or clockwise, as indicated by arrow 80b. In the embodiment of the present invention illustrated in FIG. 2, nozzles 33, 33', 32, 32' and 32" are activated depending on instantaneous movement direction 80a, 80b of cleaning unit 30.

If cleaning unit 30 moves to the right or counterclockwise, as illustrated in FIG. 2a), only water nozzles 32' and 32" as well as air nozzle 33 are active. Water nozzle 32" situated at the front in movement direction 80a sprays a water jet 44 onto cover 22, with the aid of which the contaminants are initially loosened. Wiper blade 38' situated at the front in movement direction 80a wipes off the contaminants loosened in this manner. Water nozzle 32' situated between wiper blades 38 and 38' sprays another water jet 44 onto the section of cover 22 already precleaned in this manner to rinse off residual contaminants or smears left behind by wiper blade 38'. Wiper blade 38 situated at the rear in the movement direction wipes off the remaining moisture. Air nozzle 33 situated at the rear in the movement direction blows an air stream 42 onto cover 22, whereby the latter is dried.

If cleaning unit 30 moves to the left or clockwise, as illustrated in FIG. 2b), only water nozzles 32 and 32' as well as air nozzle 33' are active. Water nozzle 32 situated at the front in movement direction 80b sprays a water jet 44 onto cover 22, with the aid of which the contaminants are initially loosened. Wiper blade 38 situated at the front in movement direction 80b wipes off the contaminants loosened in this manner. Water nozzle 32' situated between wiper blades 38 and 38' sprays another water jet 44 onto the section of cover 22 already precleaned in this manner to rinse off residual contaminants or smears left behind by wiper blade 38. Wiper blade 38' situated at the rear in the movement direction wipes off the remaining moisture. Air nozzle 33' situated at the rear in the movement direction blows an air stream 42 onto cover 22, whereby the latter is dried.

An alternative embodiment of a method according to the present invention is illustrated in FIG. 3 in the form of a flowchart.

In this embodiment, the cleaning system may take on three different operating states, depending on the instantaneous ambient conditions, in particular the temperature. The remaining of cleaning unit 30 in a parking position 60 is viewed as a fourth or "zeroth" state.

In a first method step 110, a detector unit is read out, which is designed to detect a contamination of cover 22, for example optically. In step 120, the data read out with the aid of the detector unit is checked whether a contamination of cover 22 is present. If no contamination is detected, cleaning unit 30 remains in parking position 60 according to step 140. All nozzles 32, 32', 32", 33, 33' as well as heating devices are deactivated.

If a contamination is detected, a temperature sensor, which is designed to detect an instantaneous temperature of cover 22 and/or surroundings 70, is read out a step 130, which follows step 120. In step 150, a check is made of whether the read-out temperature is below a predetermined critical temperature $T_c$, $T_c$ being settable, for example, depending on the cleaning liquid used (e.g., $T_c=0°$ C. or $-10°$ C. or $-20°$ C. or $-30°$ C. or even lower, e.g., depending on the antifreeze agent used and the concentration thereof). If the detected temperature is lower than $T_c$, cleaning unit 30 is placed into a first operating state in step 160, in which first nozzles 32, 32' and 32" remain deactivated. Second nozzles 33, 33' (air nozzles) are activated. A heating device is also activated, which heats the gas stream of second nozzles 33, 33'. In step 200, the cleaning unit is subsequently placed into motion by drive unit 35, and cover 22 is cleaned.

If the detected temperature is higher than $T_c$, a check is made in step 170 of whether the detected temperature is also higher than a value of 4° C. If this is not the case, cleaning unit 30 is placed into a second operating state in step 180, in which first nozzles 32, 32' and 32" and second nozzles 33, 33' (air nozzles) are activated. A heating device is also activated, which heats the gas stream of second nozzles 33, 33' and/or the cleaning liquid. In step 200, the cleaning unit is subsequently placed into motion by drive unit 35, and cover 22 is cleaned.

If the detected temperature is higher than 4° C., cleaning unit 30 is placed into a third operating state in step 190, in which first nozzles 32, 32' and 32" and second nozzles 33, 33' (air nozzles) are activated without the gas stream and/or the cleaning liquid being heated. In step 200, the cleaning unit is subsequently placed into motion by drive unit 35, and cover 22 is cleaned.

After ending a cleaning operation, the method is restarted by detector unit again being read out (step 110). If the contamination was removed, cleaning unit 30 is placed into a parking position 60 according to step 140, and all previously active nozzles 32, 32', 32", 33, 33' and heating devices are deactivated.

What is claimed is:

1. A device configured to detect surroundings of a vehicle, the device comprising:
    a housing;
    at least one sensor situated within the housing, the housing including a transmitter/receiver window and a cover, the cover being configured to be transparent to sensor signals of the sensor, and the cover being configured to cover the transmitter/receiver window against external surroundings of the device; and
    a cleaning unit which is situated at an outside of the housing, the cleaning unit being moved relative to the housing using a drive unit, the cleaning unit being configured to remove contaminants from the cover, wherein the cleaning unit includes at least three first nozzle configured to spray a cleaning liquid onto the cover, and the cleaning unit includes at least two second nozzle configured to blow a gas onto the cover,
    the first nozzles being situated between the second nozzles in a plane extending parallel to a movement direction of the cleaning unit,
    wherein the housing includes at least one guide rail, the cleaning unit being situated at the outside of the housing with the aid of the guide rail and being movable along the guide rail using the drive unit.

2. The device as recited in claim 1, wherein the liquid is water, and the gas is compressed air.

3. The device as recited in claim 1, wherein the at least three first nozzles and the at least two second nozzles are situated in series with respect to the movement direction of the cleaning unit.

4. The device as recited in claim 1, wherein the cleaning liquid and/or the gas is heatable.

5. The device as recited in claim 1, wherein the cleaning unit includes at least one wiper blade which is in friction contact with the cover.

6. The device as recited in claim 1, wherein the cleaning unit includes at least one heating element, which is configured to heat the cover.

7. The device as recited in claim 1, wherein the drive unit includes a step motor.

8. The device as recited in claim 1, wherein the device includes a detector configured to detect a contamination of the cover.

9. The device as recited in claim 1, wherein the device includes a temperature sensor which is configured and situated to detect a temperature of the cover and/or the surroundings.

10. A method for cleaning a cover of a device configured to detect surroundings of a vehicle, the device including a housing, at least one sensor situated within the housing, the housing including a transmitter/receiver window and the cover, the cover being configured to be transparent to sensor signals of the sensor, and the cover being configured to cover the transmitter/receiver window against external surroundings of the device, and a cleaning unit which is situated at an outside of the housing, the cleaning unit being moved relative to the housing using a drive unit, the cleaning unit being configured to remove contaminants from the cover, wherein the cleaning unit includes at least three first nozzle configured to spray a cleaning liquid onto the cover, and the cleaning unit includes at least two second nozzle configured to blow a gas onto the cover, the method comprising:
    moving the cleaning unit relative to the housing using the drive unit, contaminants being removed from the cover by the cleaning unit,
    the first nozzles being situated between the second nozzles in a plane extending parallel to a movement direction of the cleaning unit,
    wherein the housing includes at least one guide rail, the cleaning unit being situated at the outside of the housing with the aid of the guide rail and being movable along the guide rail using the drive unit.

11. The method as recited in claim 10, further comprising:
    activating the first and second nozzles depending on an instantaneous movement direction of the cleaning unit.

12. The method as recited in claim 10, further comprising:
    measuring a temperature of the surroundings and/or the cover, the first nozzles and/or the second nozzles and a heating device for heating the second nozzles being activated depending on the measured temperature.

\* \* \* \* \*